United States Patent
Bahr et al.

(10) Patent No.: US 7,197,340 B2
(45) Date of Patent: Mar. 27, 2007

(54) RADIO MODULE

(75) Inventors: Michael Bahr, Berlin (DE); Marian Baran, Berlin (DE); Jörg Romahn, Berlin (DE); Peter Schwalbach, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 64 days.

(21) Appl. No.: 10/519,878

(22) PCT Filed: Jun. 27, 2003

(86) PCT No.: PCT/DE03/02213

§ 371 (c)(1),
(2), (4) Date: Dec. 30, 2004

(87) PCT Pub. No.: WO2004/006600

PCT Pub. Date: Jan. 15, 2004

(65) Prior Publication Data

US 2005/0272461 A1 Dec. 8, 2005

(30) Foreign Application Priority Data

Jul. 3, 2002 (DE) .................................. 102 30 619

(51) Int. Cl.
*H04M 1/00* (2006.01)
*G06F 3/00* (2006.01)

(52) U.S. Cl. ................ 455/569.1; 455/556.1; 710/8

(58) Field of Classification Search ............ 455/569.1, 455/556.1, 557, 573, 574, 343.2, 575.2, 575.1, 455/41.2; 710/550.1, 8
See application file for complete search history.

(56) References Cited

U.S. PATENT DOCUMENTS

| 6,397,269 | B1 | 5/2002 | Petty et al. |
| 6,885,848 | B2* | 4/2005 | Lee ........................... 455/41.2 |
| 2002/0098840 | A1* | 7/2002 | Hanson et al. .............. 455/435 |
| 2003/0003943 | A1* | 1/2003 | Bajikar ....................... 455/550 |
| 2003/0207703 | A1* | 11/2003 | Liou et al. ................. 455/575.2 |
| 2004/0080530 | A1* | 4/2004 | Lee ............................. 345/738 |
| 2004/0204155 | A1* | 10/2004 | Nassimi .................. 455/569.1 |
| 2005/0033684 | A1* | 2/2005 | Benedyk et al. .............. 705/39 |

FOREIGN PATENT DOCUMENTS

EP 0 670 638 9/1995

* cited by examiner

*Primary Examiner*—Naghmeh Mehrpour
(74) *Attorney, Agent, or Firm*—Bell, Boyd & Lloyd LLP

(57) ABSTRACT

The present invention relates to a radio module which has at least two operational modes; a passive operational model wherein an external microprocessor device is connected to the radio module as an external electrical device, the radio module is used as a modem for the external microprocessor device and the radio module can be controlled by the external microprocessor device with the aid of modem control signals, preferably AT commands, and at least one active operation model wherein at least one actuator or sensor is connected to the radio module as an external electrical device, the radio module controls the at least one actuator or sensor and/or acts as a read-out therefore and can be controlled from the outside with the aid of the radio device. In order to ensure that the radio module can function with as few connection pins as possible, the electric pin configuration is such that it can be modified, whereby the microprocessor device uses at least one connection pin for both the passive operational model and the active operational mode.

8 Claims, 3 Drawing Sheets

FIG 4

| Connection pins | Passive mode = Modem operation | Active mode |
|---|---|---|
| S1 – S5 | Digital audio interface | programmable digital IO ports (keypad interface, relay controller, ...) External event controller (interrupt signaling) Serial interfaces (asynchronous, IrDa, I2C, USB) Digital signal processor functions Signal generator, signal tones Timed signal detection Pulse width modulation Voice inputs and voice outputs |
| S6 – S14 | Modem interface (serial interface) for AT commands | as for connection pins S1 to S5 |
| S15 – S18 | Second serial interface | as for connection pins S1 to S5 |
| S19 | TX burst | as for connection pins S1 to S5 |

RADIO MODULE

BACKGROUND OF THE INVENTION

The present invention relates to a radio module having a radio device, an internal microprocessor device connected to the radio device and an interface which is connected to the microprocessor device and has connection pins for connecting the radio module to at least one external electrical apparatus. The radio module is designed such that it has at least two modes of operation in which it can be operated; specifically, a passive mode of operation, in which an external microprocessor device is connected to the radio module as an external electrical apparatus, the radio module is used as a modem for the external microprocessor device, and the radio module can be actuated by the external microprocessor device using modem actuation signals, preferably AT commands, and at least one active mode of operation, in which at least one actuator or sensor is connected to the radio module as an external electrical apparatus, the radio module actuates and/or reads the at least one actuator or sensor and, for its part, can be actuated externally via the radio device.

A radio module of this type is sold by the company Wavecom under the product name WismoPac. This previously known radio module can be operated in two modes of operation; specifically, in a first mode of operation, in which the radio module operates as a modem, and in a second mode of operation, in which the modem is used in a telecommunication terminal, such as a mobile phone, and undertakes all control functions therein. The previously known radio module has an interface with 222 connection pins, among which a first group of connection pins forms a serial interface, namely an RS-232 interface, for modem operation using AT commands. All other connection pins form a second group of connection pins which are responsible for all other tasks of the previously known module; for example, for the connection of microphones, loudspeakers, SIM cards or other components.

The present invention is directed toward specifying a radio module which requires as few connection pins as possible.

SUMMARY OF THE INVENTION

Against the background of a radio module of the type specified above, the present invention provides for the electrical assignment of the connection pins being designed to be reconfigurable such that the microprocessor device uses at least one connection pin both for the passive mode of operation and for at least one of the active modes of operation.

An advantage of the radio module according to the present invention is that it can be manufactured particularly inexpensively because the inventive radio module requires significantly fewer connection pins for the interface than previously known radio modules, which reduces costs for materials and manufacture. The inventive radio module achieves this by virtue of the connection pins of the interface being available not exclusively for one respective mode of operation of the radio module, but rather, at least to some extent, being able to be used selectively by two or more modes of operation. In this context, the present invention makes use of the insight that the inventive radio module is always operated exclusively in a single mode of operation at any time. Thus, appropriate actuation or appropriate reading of the connection pins of the interface makes it possible to ensure at all times that each mode of operation of the radio module has its required number of connection pins and the required assignment of the connection pins available.

In one embodiment of the inventive radio module, the microprocessor device is programmed with at least two software programs, among which one software program forms the operating system of the radio module, which stipulates the electrical assignment of the connection pins for each of the at least two modes of operation of the radio module, and at least one further software program forms application software (that is to say, software which is to be regulated by the user of the radio module) which stipulates the respective mode of operation of the radio module. Splitting the microprocessor software into at least two separate software programs results in the application software generated by the user of the radio module is separated from the actual operating system of the radio module in terms of programming. The electrical assignment of the connection pins, therefore, cannot be altered unintentionally by the application software of the user of the radio module.

In an embodiment the user of the radio module is unable to reprogram the connection pins or to alter the assignment of the connection pins. This can be achieved if just the application software can be altered externally by the user, whereas the operating system cannot be altered by the user.

It is a fairly simple and thus advantageous matter to prevent the user from altering the operating system by virtue of the operating system being formed by firmware.

It is also a simple and advantageous matter for the inventive radio module to be programmed by the user if the application software is interpreter software which is preferably based on one of the two programming languages Basic or Java®. Java® is a registered mark belonging to Sun Microsystems, Inc., Palo Alto, USA.

In many countries, official permits are required before radio devices may be operated. To ensure that an official permit obtained for the inventive radio module is not put at risk by virtue of the application software of the user altering the electrical properties of the radio module such that the radio module is no longer under the official permit, it is preferable if the application software and the operating system are separate from one another such that the radio device and the interface may be actuated exclusively by the operating system, and the application software is able to access the interface and the radio device exclusively under the switching and control of the operating system, and the application software is prevented from accessing the interface and the radio device directly. In other words, this design of the radio module prevents the operating system of the radio module from being able to be altered by the user using his/her application software; permit problems on account of the application software of the customer are thus reliably prevented. In specific terms, this is because the permanently preprogrammed operating system of the radio module exclusively stipulates the configuration of the interface and the connection assignment of the connection pins. The application software of the user then merely selects a respective one of the configurations permanently prescribed by the operating system. It is not possible for the application software to access the configuration of the radio module or the radio device in the radio module directly.

Since the passive mode of operation, that is to say the modem mode of operation, does not require application software from the user, it is advantageous if the passive mode of operation of the radio module is stored entirely in the operating system of the radio module.

BRIEF DESCRIPTION OF THE INVENTION

FIG. 4 shows a table with an exemplary embodiment of an assignment of the connection pins in the case of an interface with 19 connection pins.

DETAILED DESCRIPTION OF THE INVENTION

Figure 1:
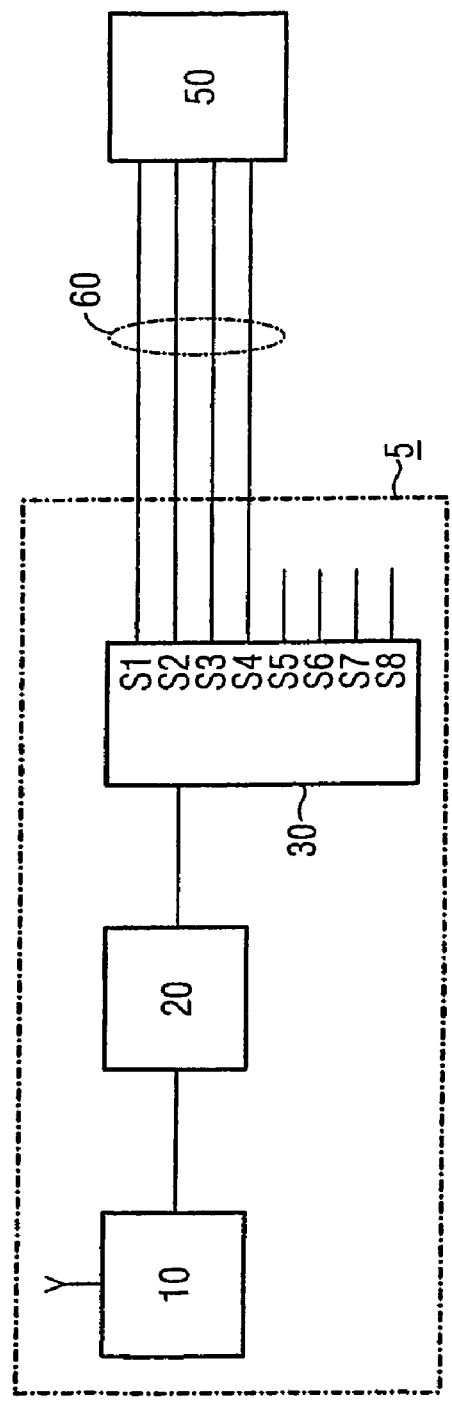
FIG. 1 shows an exemplary embodiment of an inventive radio module which is operated in the passive mode of operation.

FIG. 1 shows a radio module 5 with a radio device 10, a microprocessor device 20 and an interface 30. The radio device 10 is connected to the microprocessor device 20, which is also connected to the interface 30. The interface 30 has connection pins S1, S2, . . . , S8 which can be used to connect the radio module 5 to external electrical apparatuses.

In the illustration shown in FIG. 1, the radio module 5 is operated as a modem; that is to say, in a passive mode of operation. For this, an external computer 50 is connected to the interface 30 of the radio module 5. The electrical connection between the interface 30 and the external computer 50 is ensured by a subgroup 60 of the connection pins; namely, by the connection pins S1, S2, S3 and S4. This subgroup 60 is used to interchange "AT commands" between the radio module 5 and the external computer 50 in order to operate the radio module 5 as a modem.

For reasons of clarity, FIG. 1 shows only four connection pins (S1 to S4) for the connection between the external computer 50 and the radio module 5. It should be pointed out that the number of connection pins is arbitrary, as it were, and is dependent only on the specific technical configuration of the data connection between the radio module 5 and the external computer 50. By way of example, the number of connection pins for the modem connection may also be nine (cf. the explanations with regard to FIG. 4, for example).

Figure 2:
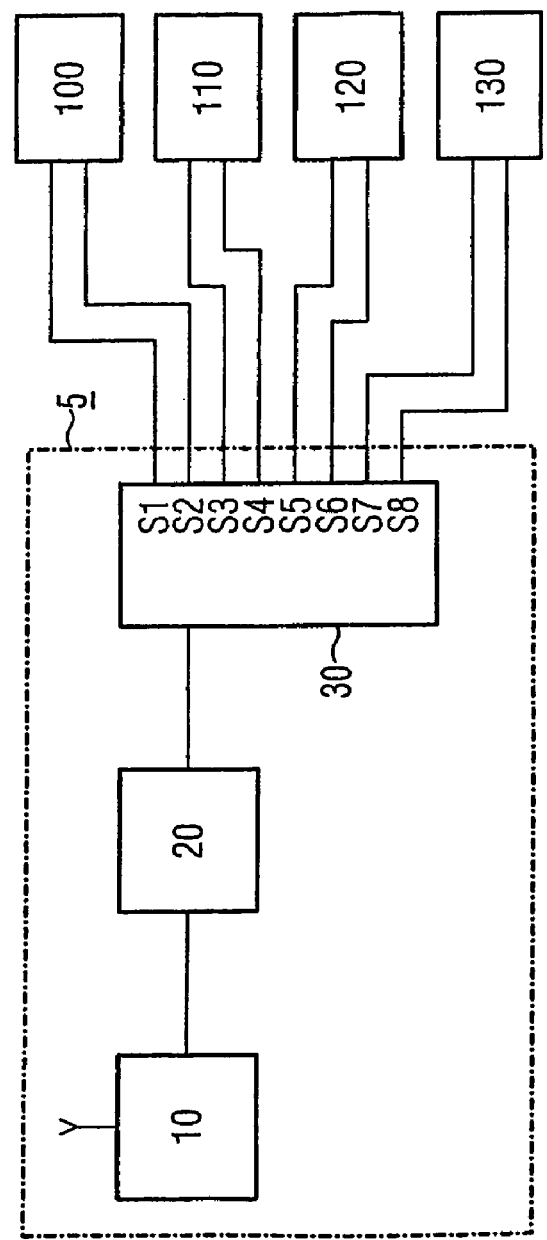
FIG. 2 shows the radio module shown in FIG. 1 in an active mode of operation.

FIG. 2 shows the radio module 5 shown in FIG. 1 in an active mode of operation; specifically, the radio module 5 in the illustration shown in FIG. 2 is being operated in a communication terminal. For this, a loudspeaker 100 as an actuator, a microphone 110 as a sensor, a display device 120 and a dialing keypad 130 are connected to the connection pins S1 to S8 of the interface 30.

In FIGS. 1 and 2, the connection pins S1 to S4 are seen to be used twice. This is because in modem operation, as shown in FIG. 1, they are used to transmit AT commands and, as shown in FIG. 2 they are also used to connect actuators and sensors in the case of an active mode of operation.

Figure 3:
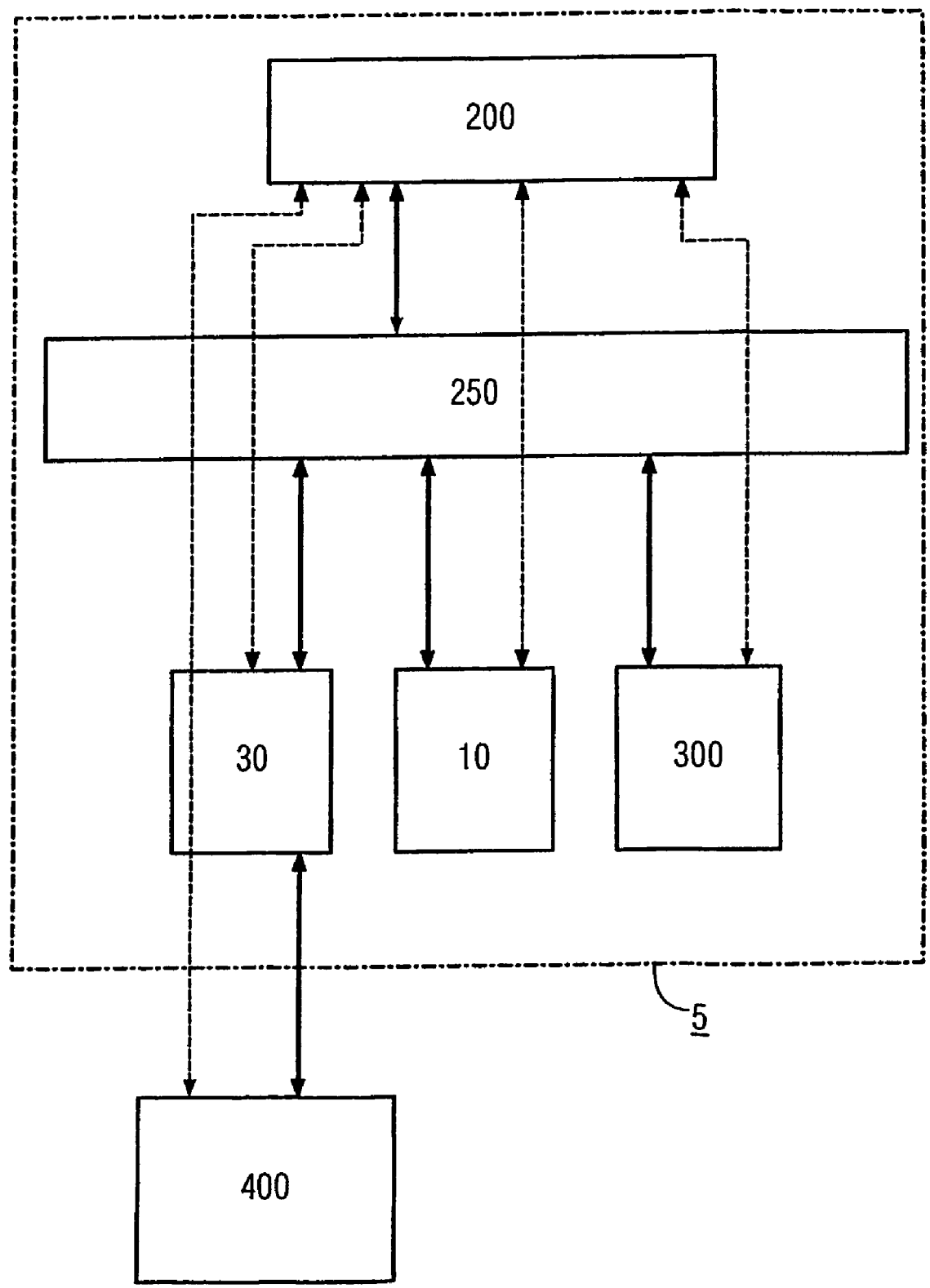
FIG. 3 shows a schematic illustration of the division of the microprocessor software into operating system software and application software.

FIG. 3 shows a schematic illustration of the radio module 5 from the "software end." Specifically, it is possible to see a block 200 which represents the application software of the radio module 5. In this context, application software is understood to be that software which a user of the radio module 5 can implement. The application software 200 is connected to the operating system 250 of the radio module 5. In the exemplary embodiment shown in FIG. 3, the operating system is formed by "firmware," that is to say permanently preprogrammed software which cannot be altered by the user. The firmware may be implemented in ROM chips; for example, EPROM chips.

In the exemplary embodiment shown in FIG. 3, the operating system 250 is controlling the interface 30 as an I/O device, the radio device 10 and a memory 300 in the microprocessor device 20. This is marked in FIG. 3 by bold solid double-headed arrows.

In the illustration shown in FIG. 3, external appliances 400 are connected to the interface 30.

The application software 200 can never access the interface 30, the radio device 10 and the memory 300 directly, but rather only as a result of switching of the operating system 250. This is illustrated in FIG. 3 by thin, dashed double-headed arrows.

The operating system 250 of the radio module 5 thus stipulates how the connection pins S1 to S8 of the interface 30 are to be used. To this end, the operating system contains various prescribed configurations, specifically in the form of firmware, which stipulate when what connection pins of the interface 30 are to be used in what respective manner.

The specific appearance which the assignment of the connection pins may have, by way of example, is shown by the table in FIG. 4 with reference to an exemplary embodiment of an interface 30 equipped with 19 connection pins.

Although the present invention has been described with reference to specific embodiments, those of skill in the art will recognize that changes may be made thereto without departing from the spirit and scope of the present invention as set forth in the hereafter appended claims.

The invention claimed is:

1. A radio module which may be operated in at least two modes of operation, comprising:
    a radio device;
    an internal microprocessor device connected to the radio device; and
    an interface which is connected to the internal microprocessor device, the interface including a plurality of connection pins for connecting the radio module to at least one external electrical apparatus;
    wherein in a passive mode of operation, an external microprocessor device is connected to the radio module as an external electrical apparatus, the radio module is used as a modem for the external microprocessor device, and the radio module may be actuated by the external microprocessor device using attention (AT) commands;
    wherein in at least one active mode of operation, at least one actuator or sensor is connected to the radio module as an external apparatus, the radio module at least one of actuates and reads the at least one actuator or sensor and may be actuated externally via the radio device; and
    wherein an electrical assignment of the plurality of connection pins is reconfigurable such that the internal microprocessor device uses at least one of the plurality of connection pins both for the passive mode of operation and for one of the active modes of operations.

2. A radio module as claimed in claim 1, wherein the internal microprocessor device is programmed with at least two software programs, with one software program forming an operating system of the radio module, which stipulates the electrical assignment of the connection pins for each of the at least two modes of operation of the radio module, and with at least one further software program forming application software which stipulates a respective mode of operation of the radio module.

3. A radio module as claimed in claim 2, wherein the application software may be altered externally by a user, whereas the operating system cannot be altered by the user.

4. A radio module as claimed in claim 3, wherein the operating system is formed by firmware.

5. A radio module as claimed in claim 3, wherein the application software is interpreter software.

6. A radio module as claimed in claim 5, wherein the interpreter software is based on one of Basic and Java programming languages.

7. A radio module as claimed in claim 2, wherein the application software is separate from the operating system such that the radio device and the interface may be actuated exclusively by the operating system, the application software may access the interface and the radio device exclusively under switching and control of the operating system, and the application software is prevented from accessing the interface and the radio device directly.

8. A radio module as claimed in claim 2, wherein the passive mode of operation is stored entirely in the operating system.

* * * * *